United States Patent [19]

Artweger

[11] 4,301,789
[45] Nov. 24, 1981

[54] ENERGY CONVERSION APPARATUS

[76] Inventor: Wolfgang Artweger, Windischgarsten 36, Austria, A-4580

[21] Appl. No.: 61,467

[22] Filed: Jul. 27, 1979

Related U.S. Application Data

[62] Division of Ser. No. 823,497, Aug. 10, 1977, Pat. No. 4,210,122.

[30] Foreign Application Priority Data

Aug. 11, 1976 [AT] Austria ................. 5983/76

[51] Int. Cl.³ .............................. F24J 3/02
[52] U.S. Cl. ................................. 126/439; 126/422; 126/445; 126/900
[58] Field of Search ............... 126/438, 439, 450, 900, 126/901, 418, 419, 422, 448, 445

[56] References Cited

U.S. PATENT DOCUMENTS

| 2,489,751 | 11/1949 | Candler | 126/900 |
|---|---|---|---|
| 2,595,905 | 5/1952 | Telkes | 126/419 |
| 3,866,285 | 2/1975 | Clark | 126/438 |
| 3,951,128 | 4/1976 | Schoenfelder | 126/438 |
| 3,957,029 | 5/1976 | Nozik | 126/438 |
| 3,981,293 | 9/1976 | Gillery | 126/901 |
| 4,005,583 | 2/1977 | Ramey | 126/900 |
| 4,030,478 | 6/1977 | Beaver | 126/448 |
| 4,047,518 | 9/1977 | Anderson | 126/900 |
| 4,078,547 | 3/1978 | Malecek | 126/439 |
| 4,116,222 | 9/1978 | Seifried | 126/900 |

Primary Examiner—Daniel J. O'Connor
Attorney, Agent, or Firm—Kurt Kelman

[57] ABSTRACT

A modular solar collector comprises a plurality of detachably interconnected modules forming a closed structural surface. Each module comprises a solar collector unit with a cavity receiving a heat carrier fluid through an inlet and delivering the heated fluid through an outlet, the inlet and out each having a coupling part. The unit is carried on a mounting plate which has a conduit portion for the fluid embedded therein. The inlet and outlet ends of the conduit portion each has a coupling part. The inlet end coupling part and the outlet coupling part, on the one hand, and the outlet end coupling part and the inlet coupling part, on the other hand, are matched for detachable assembly to form detachable joints between respective registering pairs of the coupling parts for detachably assembling the unit and the mounting plate. One of the detachable joints detachably assembles adjacent ones of the mounting elements and the conduit portions detachably joined to the cavities form a conduit system for the heat carrier fluid to and from the cavities. The unit comprises a transparent front plate, a rear plate, the plates defining the cavity therebetween, and an element arranged between the outer surface of the front plate and the inner surface of the rear plate which does not transmit solar radiation.

7 Claims, 4 Drawing Figures

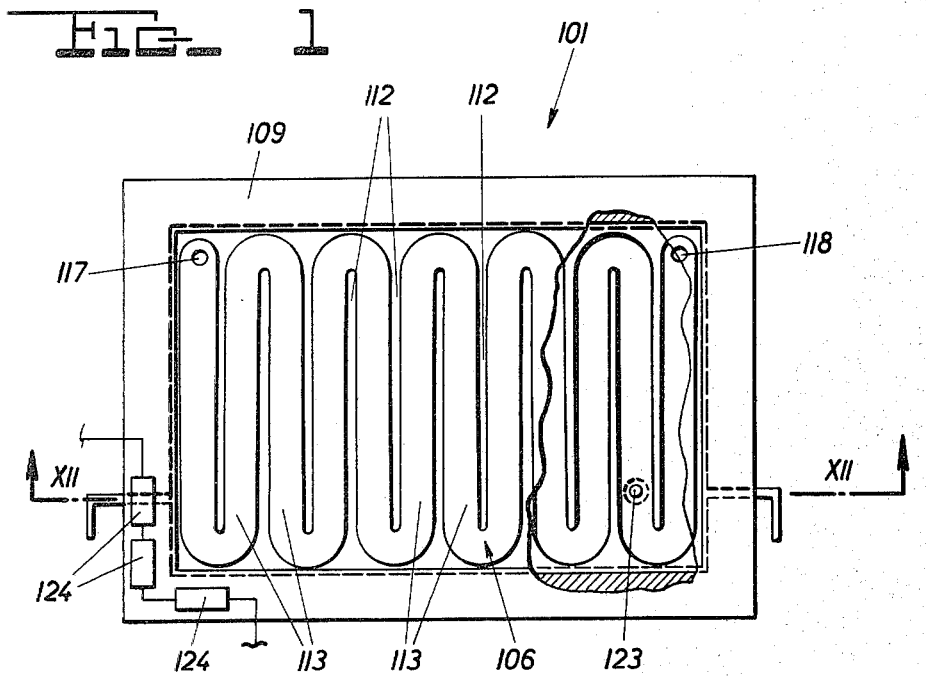
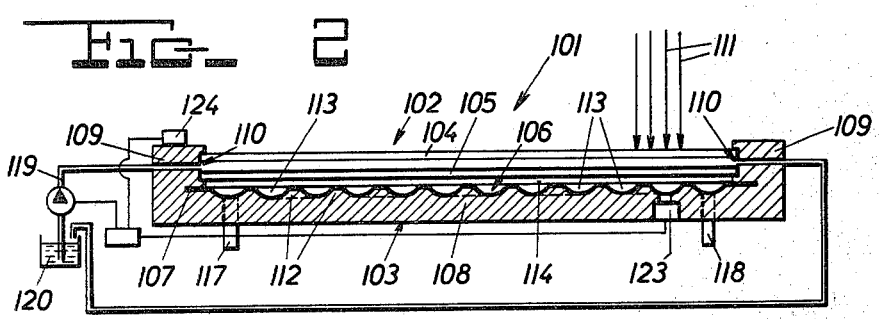
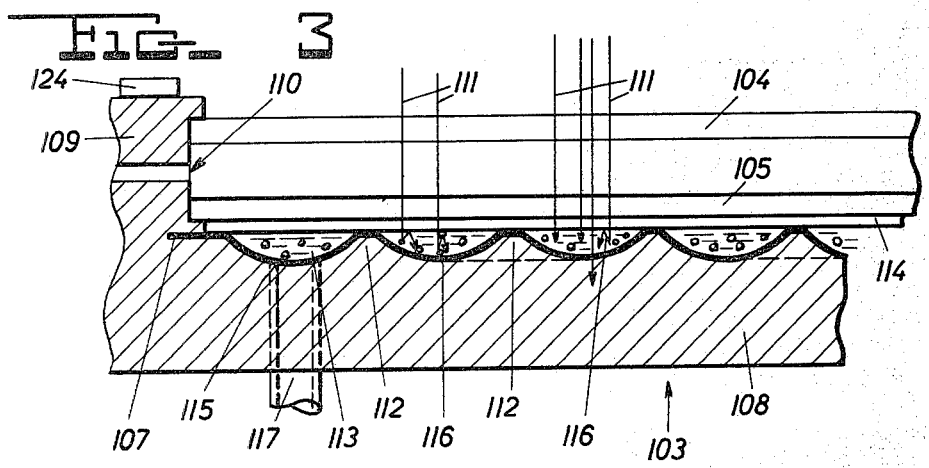

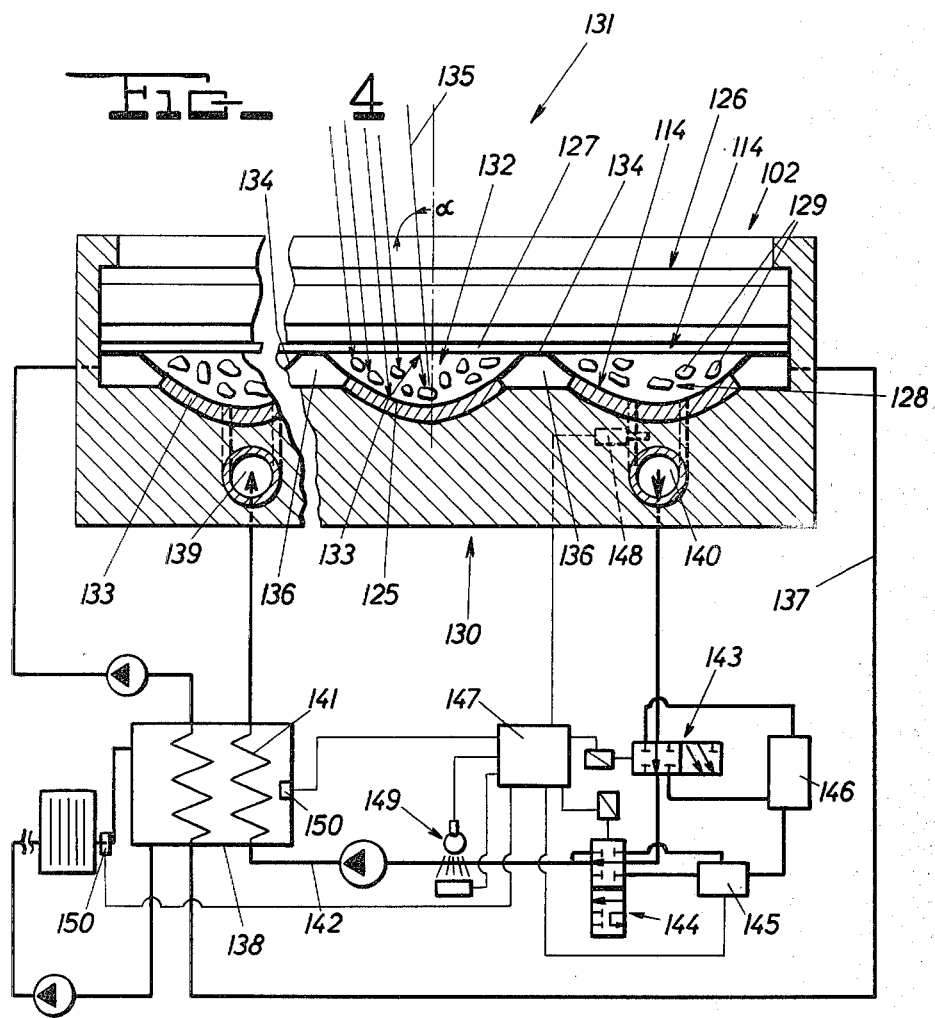

ENERGY CONVERSION APPARATUS

This is a division of application Ser. No. 823,497, filed Aug. 10, 1977, now U.S. Pat. No. 4,210,122.

The present invention relates to improvements in energy conversion units arranged for exposure to solar radiation and defining a cavity capable of receiving a heat carrier fluid, the unit including an inlet and an outlet for the fluid in communication with the cavity. A conduit delivers the heat carrier fluid, such as water or air, to the cavities and removes the heated fluid therefrom to a heat consumption system normally including a heat exchanger.

It is an object of this invention to provide an improved energy conversion unit of high energy conversion efficiency, which uses a large spectrum of the solar radiation for conversion into thermal energy while making its manufacture and servicing simple and dependable.

The above and other objects are accomplished in accordance with the invention with an energy conversion unit for converting solar into thermal energy, which comprises a rear plate having an inner surface, a transparent front plate having an outer surface arranged for exposure to solar radiation and an inner surface, the inner surfaces of the front and rear plates facing each other and defining a cavity therebetween, a heat carrier fluid in the cavity, and an element arranged between the outer surface of the front plate and the inner surface of the rear plate which does not transmit solar radiation.

The energy conversion units of this invention have the advantage that the additional solar radiation reflection and/or absorption between the outer surface of the transparent front plate and the inner surface of the rear plate makes it possible to utilize even radiation of very short waves for producing thermal energy, thus greatly increasing the efficiency. In addition, a suitable arrangement of the radiation reflecting element enables the installation to be selectively shut off to avoid overheating. It also makes possible the use of a transparent front plate without loss of radiation through this plate. By placing radiation absorbing bodies in the cavity, a prolonged and even heat transfer is assured even when the solar radiation is interrupted or relatively less intensive, thus making the use of such units economical in regions of relatively little sunshine. Not only air and water may be used as heat carrier fluids but also refrigerant media, i.e. liquids of relatively low evaporating point. Thus, these energy conversion units may be used not only to heat water in private homes, for example, but also to heat the water of a swimming pool and to produce saturated steam (if refrigerants are used) to operate steam turbines.

The above and other objects, advantages and features of the invention will become more apparent from the following detailed description of certain now preferred embodiments thereof, taken in conjunction with the accompanying drawing wherein FIG. 1 is a top view of one embodiment of an energy conversion unit according to the present invention;

FIG. 2 is a section along line II—II of FIG. 1;

FIG. 3 is an enlarged view of a portion of the unit shown in FIG. 2; and

FIG. 4 shows another embodiment of an energy conversion unit.

Specific and preferred embodiments of energy conversion units will not be described in connection with FIGS. 1 to 4. Referring first to the embodiment illustrated in FIGS. 1 to 3, unit 101 is shown to be comprised of rear plate 103 having inner surface 106 and transparent front plate 102 having an outer surface arranged for exposure to solar radiation and an inner surface. The illustrated front plate is comprised of two glass walls, wall 104 forming the outer surface and wall 105 forming the inner surface of front plate 102, and the two walls defining a space therebetween. A gas of low heat conductivity may fill the space. The illustrated rear plate is comprised of a synthetic resin plate 107 forming the inner surface 106 and heat insulating member 108 associated therewith and having lateral walls 109 projecting from the inner surface. The lateral walls have guide and mounting means 110 for the front plate, the illustrated guide and mounting means being a channel receiving the edges of the front plate. The inner surface of the rear plate is dark colored to provide good absorption for impinging solar radiation 111. Economically, plate 107 may be made of a glass fiber reinforced polyester, which may be readily shaped.

The inner surfaces of the front and rear plates face each other and define a cavity therebetween, the illustrated cavity being constituted by a meandering channel defined by inner surface 106 of the rear plate and consisting of substantially parallel channel sections 113 of paraboloid cross section, the focal point of the paraboloid channel sections being disposed between the sun and the bottom of the channel sections and the focal length being relatively small. At least partially transparent webs 112 separate individual channel sections of the meandering channel, respective ends of adjacent channel sections being in communication with each other. This channel configuration is particularly effective because it permits the transparent front wall to be used substantially entirely for receiving the impinging solar radiation. This effect is further enhanced by the transparent webs between the channel sections which webs additionally operate for converting the solar energy impinging thereon into thermal energy, the converted energy being carried by a heat carrier fluid flowing through the channel system.

As clearly shown in FIGS. 2 and 3, solar radiation reflecting element 114 is arranged between the outer surface of the front plate and the inner surface of the rear wall, this element being constituted in the illustrated embodiment by a synthetic resin film mounted on glass wall 105 and capable of transmitting the solar radiation 111 to the heat carrier fluid 115 in channel 113 while reflecting heat radiation 116 from inner surface 106 and from fluid 115. In this manner, all the heat is retained in the cavity between the front and rear plates, the heat reflected by element 114 passing again through the heat carrier fluid for producing additional thermal energy and heating the rear plate which serves as a heat absorbing element. This arrangement prevents energy loss since all the radiation is absorbed in the heat carrier fluid and the rear plate. A synthetic resin film can be readily mounted even in existing solar collectors and, while it permits transmission of the solar radiation into the cavity of the collector, it prevents its reflection out of it.

Respective ends of the meandering channel have conduit coupling parts 117 and 118 projecting perpendicularly from the rear plate and serving as inlet and outlet for heat carrier fluid 115. Transparent webs 112 wherebetween the channel sections are defined are fluid-tightly bonded to the inner surfaces of the front and rear plates to provide a fluid-tight flow channel for fluid 115 through the unit between the coupling parts. Such a meandering channel facilitates a turbulence-free flow of the heat carrier fluid and avoids creation of heat pockets.

It is useful to make heat insulating member 108 of a plastic foam and the entire unit may then be produced in a mold in which a suitable synthetic resin, such as polyurethane is shaped and foamed about synthetic resin plate 107 and front wall 102, with synthetic resin film 114 laminated thereto, which are placed in the mold. Shaping and foaming of member 108 thus produces a fluid-tight unit which avoids heat losses. The density of the polyurethane foam and the wall thickness between the bottom of the cavity 113 and an outer surface of the member are selected as a function of a desired amount of heat insulation. This considerably reduces any thermal energy loss from the heat carrier fluid to the ambient atmosphere and thus further increases the temperature of the fluid delivered from the unit to a heat exchanger.

In operation, when solar radiation 111 impinges upon unit 101, heat carrier fluid is pumped into inlet coupling part 117 to flow through channel 113 and leave through outlet coupling part 118, the solar radiation being converted into thermal energy carried by the fluid and any residual radiation being absorbed on inner surface 106 of rear plate 103, i.e. also converted into thermal energy eventually transferred to the fluid passing thereover. Furthermore, any radiant energy coming from the rear plate and/or the heat carrier fluid is reflected back to the fluid by reflecting element 114 which reflects such energy back into the fluid and against inner surface 106. Thus, no radiation at all escapes from the cavity.

Overheating of the unit and removal of excessive heat emanating from solar radiation 111, which may damage the unit, may be avoided by temporarily interrupting access of the radiation to the cavity in the unit by means of a selectively operable solar radiation reflecting element between the outer surface of the front wall and the heat carrier fluid in the cavity. This will increase the operating life of the unit and make it more economical. In the illustrated embodiment, this is accomplished by arranging a radiation reflecting liquid 120 in the space between glass walls 104 and 105 of the front plate. The liquid is held in a reservoir connected to the space by conduit 119 and delivery of the liquid from the reservoir into the space is effected by a pump in conduit 119 which, in turn, is controlled by thermostat control 124 actuated by a temperature probe extending into channel 113. Liquid 120 may be a liquid crystal which automatically changes by a chemical or electro chemical process from radiation transmission to radiation reflection when a limiting upper temperature has been reached. In this manner, no further means is required for shutting off the solar radiation from the heat carrier fluid in the solar collector.

In the above-described unit, most or all of the solar energy passing into heat carrier fluid 115 is converted into thermal energy, any residual solar energy being absorbed on radiation-absorbent inner surface 106. Relatively short-wave, energy-rich solar radiation reflected from the heat carrier fluid and/or the inner surface of the rear plate is reflected back into the heat carrier fluid by radiation reflecting element 114, the absorption properties of inner surface 106 and the reflecting properties of element 114 being so tuned to each other that the most energy-rich spectrum of the solar radiation is used for conversion into thermal energy. By providing thermostat control 124, radiation reflecting liquid 120 may be pumped into the space between the double-walled front plate, thus preventing overheating when the temperature probe registers a limiting temperature, for instance during the hot summer months. The thermostat control will produce a control signal when the limiting temperature in the carrier fluid has been reached, thus operating the pump and supplying the liquid into the space between walls 104 and 105, which will prevent solar radiation 111 from penetrating into the solar collector and reflect it back through wall 104 to the ambient atmosphere. Power for the control may be provided by schematically shown selenium cells mounted on the rim of heat insulating member 118 since this fail-safe control is used only when the solar radiation is very strong.

FIG. 4 shows another embodiment of an energy conversion unit 131 comprised of rear plate 130 and double-walled front plate 102. Inner surface 125 of the rear plate is a radiation reflecting element 114 and another radiation reflecting element 114 in the form of synthetic resin film 127 is laminated to the inner surface of front plate 102. In this embodiment, heat absorbing bodies 129 are suspended in heat carrier fluid 128, which bodies may consist of activated carbon. Similarly to the embodiment of FIGS. 1 to 3, inner surface 125 defines a meandering channel 132 separated by transparent webs 134, the axes 135 of the paraboloid channel sections facing the solar radiation and angle $\alpha$ between the axes and front plate 102 being adjustable to correspond to the angle of the solar radiation impinging upon the front plate. The focal length of the parabolas is very small so as to avoid formation of zones of shades in the channel sections when the radiation impinges thereon parallel to the axes of the channel sections. The transparent webs 134 between the channel sections form a second channel 136 connected by conduit 137 to heat exchanger 138. Channel 133 has coupling parts 139 and 140 at respective ends thereof for connection of the channel to heat exchange element 141 in heat exchanger 138 by means of conduit 142. Pumps are mounted in the conduits leading to and from the channels for moving heat carrier fluids therethrough, useful heat carrier fluids including water or air.

If desired, heat absorbing bodies 129 may be substantially spherical bodies filled with a cooling medium. Whatever type of heat absorbing bodies is used, they will constantly transfer thermal energy to the heat carrier fluid as it flows through channel 132 to the heat exchanger, thus rapidly producing considerable heat in the fluid. Short interruptions of solar radiation, for instance due to cloud formations, are well balanced in the system when such heat absorbing bodies are suspended in the heat carrier fluid, thus keeping the output temperature of the solar collector relatively stable. If spherical bodies made of an elastic material, such as synthetic resin, are used for this purpose, evaporation of the cooling medium in the bodies will expand the bodies to increase their surface and corresponding heat absorption capacity, thus providing thermal energy stored on these bodies for transfer to the heat carrier fluid for some time after sundown, for example.

Radiation reflecting element 114 on inner surface 125 of the rear plate may be a light solar radiation reflecting layer, such as a metallic layer consisting, for example, of chromium or silver and the like. This is a very effective reflector and thus assures full use of all radiation in the heat carrier fluid.

The intensity of the energy conversion and heat transfer, and its adaptation to prevailing operating conditions and the required thermal energy production, as well as its complete shut-off may be effected by arranging control valves 143 and 144 in conduit 142, centrifuge 146, reservoir 146 for heat absorbing bodies 129, control 147, temperature probe 148 and turbidimeter 149 also being mounted in this conduit. Control 147 is also connected to thermometer 150 sensing the temperature of heat exchanger 138 forming part of a heat consumption circuit.

Depending on the measured temperature, control valve 148 is moved from its illustrated rest position into an operative pattern when the temperature at the heat exchange has reached a given limit, thus causing heat carrier fluid 128 with heat absorbing bodies 129 suspended therein to be diverted from coupling part 140 into centrifuge 145 which removes a portion of the heat absorbing bodies into reservoir 146. The amount of the removed heat absorbing bodies is monitored and controlled by turbidimeter 149. If all of these bodies are removed from the heat carrier fluid, the impinging solar radiation will pass unhindered through the transparent heat carrier fluid to be reflected on inner surface 125 of the rear plate and will thus be entirely reflected into the fluid. If synthetic resin film 127 is totally radiation transmitting, the solar radiation will then be reflected back into the ambient atmosphere without heating the heat carrier fluid. This film may be substituted by a selective radiation reflecting and transmitting liquid in the space between the double-wall of the front plate in the manner described hereinabove in connection with FIGS. 1 to 3.

What is claimed is:

1. An energy conversion unit for converting solar into thermal energy, which comprises
   (a) a rear plate having an inner surface,
   (b) a light, radiation reflecting layer on the inner surface of the rear plate,
   (c) a transparent front plate comprised of two walls defining a space therebetween,
      (1) one of the front plate walls having an outer surface arranged for exposure to solar radiation,
      (2) the other front plate wall having an inner surface, and
      (3) the inner surfaces of the rear plate and the other front plate wall facing each other and defining a cavity therebetween,
   (d) a source of solar radiation reflecting liquid,
   (e) a conduit leading into the space between the two front plate walls,
   (f) a thermostat-controlled pump in the conduit for moving the liquid into the space under the control of the thermostat,
   (g) a heat carrier liquid arranged in the cavity for flowing therethrough, and
   (h) a radiation reflecting element associated with the front plate and consisting of a synthetic resin film capable of transmitting the solar radiation to the heat carrier liquid and of reflecting the radiation from the light, radiation reflecting layer,
      (1) the heat carrier liquid absorbing the radiation reflected by the light, radiation reflecting layer and the radiation reflecting synthetic resin film reflecting radiation from the carrier liquid back to the carrier liquid.

2. The energy conversion unit of claim 1, further comprising radiation absorbing bodies suspended in the heat carrier fluid.

3. The energy conversion unit of claim 2, wherein the bodies are activated carbon particles surrounded by the heat carrier fluid.

4. The energy conversion unit of claim 1, wherein the light, radiation reflecting layer is a metallic layer.

5. The energy conversion unit of claim 1, wherein the liquid is a selectively radiation transmitting and reflecting liquid crystal.

6. The energy conversion unit of claim 1, wherein the cavity is constituted by a meandering channel defined by the inner surface of the rear plate, the channel being comprised of channel sections of paraboloid cross section, the axis of the parabola facing the solar radiation and the focal point thereof being disposed between the sun and the bottom of the channel sections, the focal length being relatively small and the angle between the axes of the paraboloid channel sections and the front wall being adjustable.

7. The energy conversion unit of claim 6, further comprising at least partially transparent webs separating the channel sections of the meandering channel.

* * * * *